United States Patent [19]

Roussard

[11] 3,786,312

[45] Jan. 15, 1974

[54] PORTABLE ELECTRIC SCATTERBOX FOR POWER DISTRIBUTION ON A CONSTRUCTION SITE

[76] Inventor: Richard D. Roussard, 3740 N. Romero Rd., Tucson, Ariz. 85705

[22] Filed: Oct. 17, 1972

[21] Appl. No.: 298,401

[52] U.S. Cl.................. 317/112, 307/112, 307/147
[51] Int. Cl. .......................................... H02b 1/18
[58] Field of Search.................. 307/112, 147, 149; 317/99, 106, 112, 118, 120

[56] References Cited
UNITED STATES PATENTS

| | | | |
|---|---|---|---|
| 2,995,670 | 8/1961 | Weiss | 307/147 |
| 1,855,614 | 4/1932 | Sparkes | 317/106 |
| 3,416,001 | 12/1968 | Fistell | 307/112 |

Primary Examiner—Herman J. Hohauser
Assistant Examiner—Gerald P. Tolin
Attorney—John A. Robertson et al.

[57] ABSTRACT

This specification discloses a portable electric scatterbox intended for use on construction sites where the contractor has installed an electrical supply line for delivering electrical current at a voltage of 240 volts. This receptacle is provided with six receptacle outlets from which electrical current at 120 volts is taken. The scatterbox includes wiring which connects three of the receptacles to a 120-volt bus line and a neutral bus line, with a circuit breaker included in the connections. The other three of the receptacles are connected to a second 120-volt bus line and the neutral bus line, with a second circuit breaker included in these connections.

7 Claims, 4 Drawing Figures

PATENTED JAN 15 1974
3,786,312

PORTABLE ELECTRIC SCATTERBOX FOR POWER DISTRIBUTION ON A CONSTRUCTION SITE

The present invention relates to electrical scatterboxes of the type in which a plurality of outlets are provided and which receive electric current from a single source, and is concerned primarily with a portable scatterbox which is designed primarily for use on construction sites.

BACKGROUND OF THE INVENTION

At the present time it is common practice for a contractor such as a builder to install an electric supply cable of a temporary nature in a building during a stage of construction thereof. This supply cable ordinarily supplies a 30-ampere current at 240 volts. The cable includes four lines, one of which is a ground bus; the second, a neutral bus; the third, a bus line of 120 volts above neutral; and the fourth, a bus line of 120 volts below neutral. These four lines terminate in an outlet receptacle having a socket for each of the aforesaid lines.

Mechanics and artisans of various types, while working on construction jobs, require the use of electrically powered tools. When such a tool is connected to a power outlet, such as the one above described, there is ordinarily an appreciable extent of cable between the plug connection and the area where the work is being performed. Should the insulation of this cable become worn, eroded or scraped off the conductors, there is a strong liability of a short circuit developing which imperils the safety of the workmen. This factor has been recognized in two aspects. In the first place, authorities regulating construction work are now instituting codes to protect the workmem from this hazard of short circuiting. Such codes will generally be in effect in the building trades in 1974. As to the other aspect, those working in this field have recognized this danger and have attempted to safeguard against it by providing a scatterbox which includes a circuit breaker for each of the cables which are connected thereto. An example of such a device is disclosed in the U.S. Pat. to Weiss, No. 2,995,670. Known devices of this type are generally cumbersome and not easily moved about from place to place on a construction site.

The present invention is founded on the basic concept of providing a portable electric scatterbox which may be easily carried about from place to place, has good stability when positioned where it is to be used and which includes six outlet receptacles, three of which are under the control of a circuit breaker and the other three under the control of a second circuit breaker.

OBJECTS OF THE INVENTION

With the foregoing conditions in mind, the present invention has in view the following objectives:

1. To provide a portable electric scatterbox which includes a main supply cable which is adapted to be plugged into a supply cable temporarily installed in a building construction and which provides current at 240 volts, together with six 120-volt outlet receptacles, three of which are connected to the supply cable, with the circuit breaker included in the connections, and the other three being connected to the supply cable by connections including a second circuit breaker.

2. To provide, in a portable electric scatterbox of the type noted, a ground bus line, a neutral bus line, and two 120-volt bus lines, all of which are connected to corresponding lines in the cable aforesaid.

3. To provide, in a portable electric scatterbox of the character aforesaid, six 120-volt outlet receptacles, three of which are connected to one of said 120-volt bus lines and said neutral bus line by connections including a circuit breaker, with the other three of the receptacles being connected to the other of said 120-volt bus lines by connections including a circuit breaker.

4. To provide, in a portable electric scatterbox of the kind described, six outlet receptacles, each of which includes a ground line which is connected to the ground bus line.

5. To provide, in a portable electric scatterbox of the type noted, an outlet cable connected to the bus lines in the scatterbox and having a terminal which is adapted to be connected to the supply cable of a second scatterbox of the same structure and characteristics as said portable electric scatterbox.

6. To provide a portable electric scatterbox of the kind aforesaid which is mounted on a stand including a leg at each side, a foot at the bottom of each leg, and a handle connecting the upper ends of the legs above the scatterbox.

Various other detailed objects and advantages of the invention, such as arise in connection with carrying out the above ideas in a practical embodiment, will, in part, become apparent and, in part, be hereafter stated as the description of the invention proceeds.

SUMMARY OF THE INVENTION

The foregoing objects are achieved by providing a portable electric scatterbox comprising a metallic casing of generally rectangular shape presenting top, bottom and side walls, a front wall and a hingedly mounted rear wall. Mounted on the exterior surface of each side wall is a leg which extends below the bottom wall and above the top wall. Each of these legs carries a foot at its lower end and a handle extends between the upper ends of the legs is spaced relation above the top wall. Mounted on the inner face of the front wall are six 120-volt twist-lock outlet receptacles. Upstanding from the bottom wall are a pair of circuit breakers and a pair of terminal plates are mounted on the upper face of the bottom wall.

A supply cable has one end secured to one side wall and includes a ground line, a neutral line and two 120-volt lines. These lines are all connected to a plug having four prongs, which is adapted to be plugged into the socket of a supply cable that is temporarily installed by the builder. An outlet cable having the same ground, neutral and bus lines has one end anchored to the other side wall with its other end carrying a terminal having four sockets adapted to receive the four prongs on a terminal of the supply cable of a second scatterbox which is to be connected in series with the aforesaid scatterbox.

The scatterbox is provided with wiring which connects the supply cable to the six-outlet 120-volt twist-lock receptacles. This wiring comprises a ground bus which is connected to the bus line of the supply cable and is grounded to the metallic casing. It also includes a neutral bus which is connected to the neutral line of the supply cable and two 120-volt buses which are connected to the two 120-volt lines of the supply cable.

Three of the outlet receptacles are connected to one 120-volt bus and the neutral bus by a pair of lines which includes a circuit breaker, and the other three of the 120-volt outlet receptacles are connected to the other of the 120-volt buses and the neutral bus by a pair of lines which include a circuit breaker. Each of the 120-volt twist-lock outlet receptacles is connected to the ground bus.

For a full and more complete understanding of the invention, reference may be had to the following description and the accompanying drawings wherein.

DESCRIPTION OF THE EMBODIMENT

Figure 1:
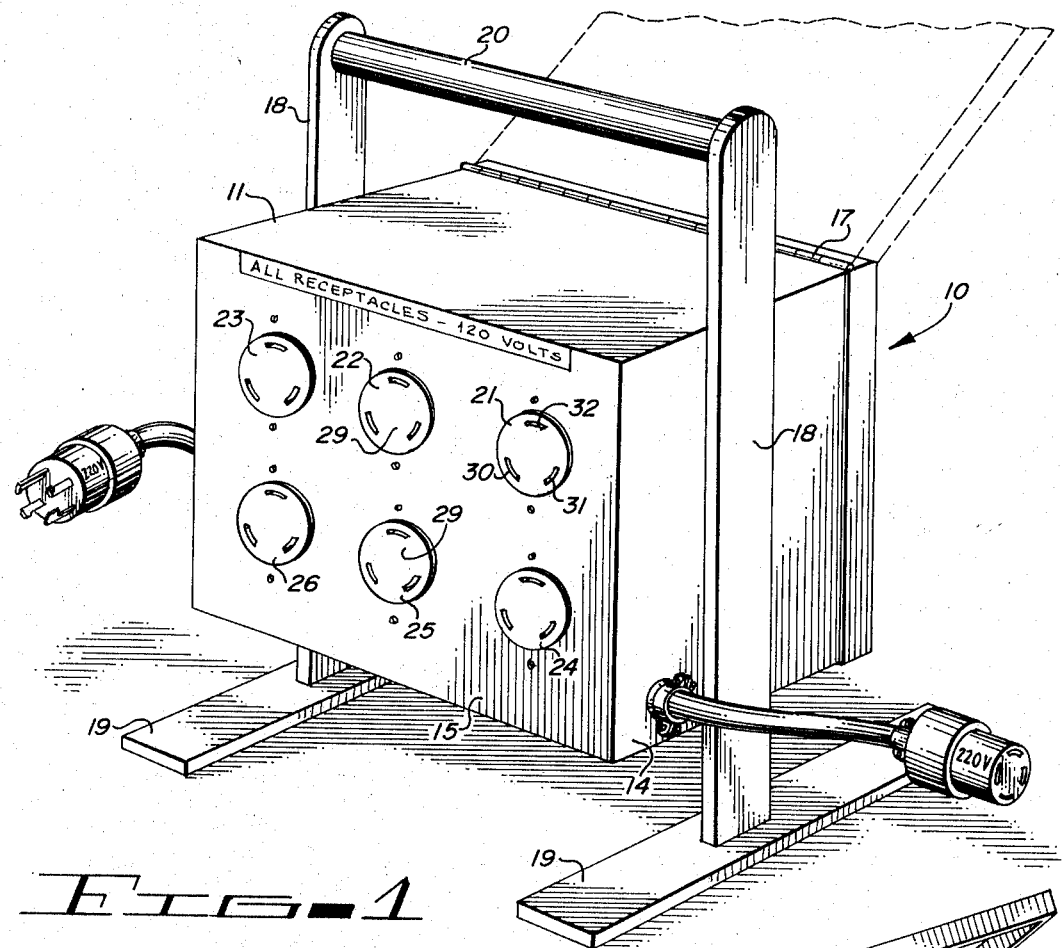
FIG. 1 is a perspective view of the scatterbox of this invention, looking at the front side and with the rear wall shown in an elevated position.
Figure 2:
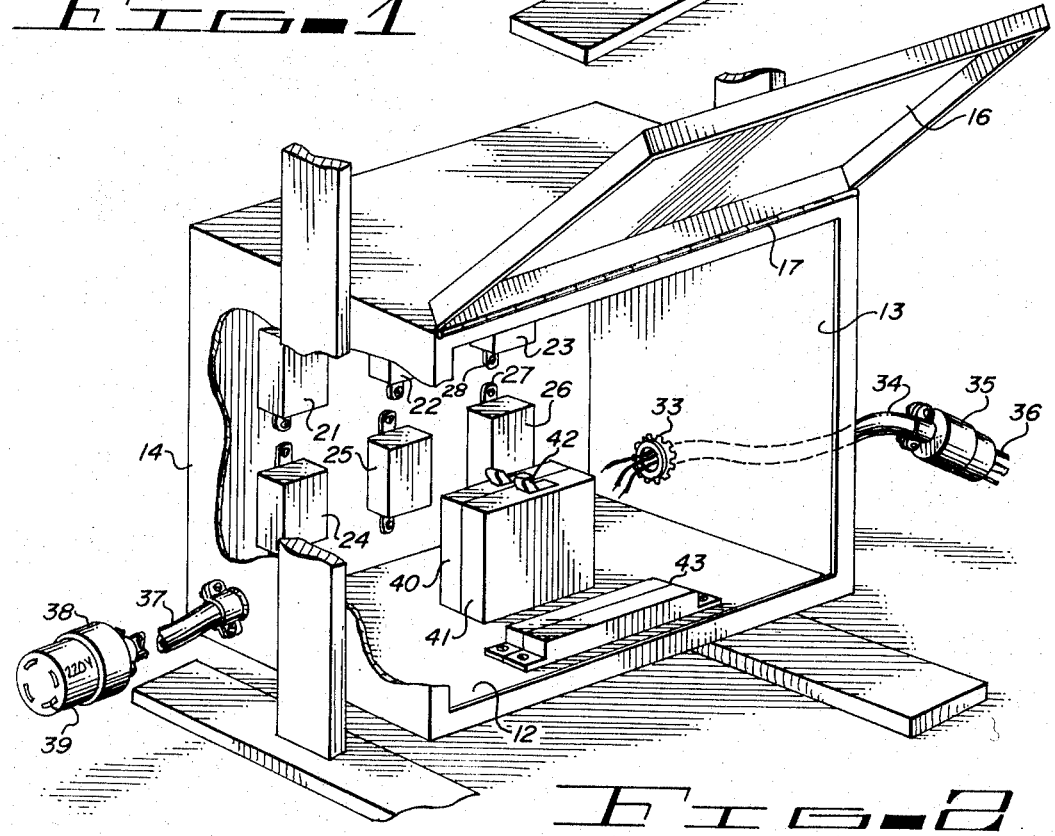
FIG. 2 is another perspective, looking at the inside of the scatterbox from the rear and with a portion of one side wall broken away.

Referring now to the drawings wherein like reference characters denote corresponding elements throughout the several views, and first more particularly to FIGS. 1 and 2, the scatterbox of this invention is shown as including a box which is identified in its entirety by the reference character 10. Box 10 comprises a top wall 11, a bottom wall 12, side walls 13 and 14, a front wall 15 and a rear wall or door 16 which is hingedly mounted at the rear edge of top wall 11, as indicated at 17. The wall structure above described is of metal, with iron or steel indicated as the preferred material.

Secured to the outer faces of side walls 13 and 14 are a pair of vertical legs 18 which extend above top wall 11 and below bottom wall 12. Each leg 18 is provided with a foot 19 at its lower end with these feet having an appreciable extent, as illustrated, to afford good stability when the scatterbox is placed in a position for use. Extending between the upper ends of legs 18 is a handle 20, which is grasped by a workman in moving the scatterbox from place to place.

As shown in FIG. 2, six twist-lock outlet receptacles 21, 22, 23, 24, 25 and 26 are mounted on the inner face of front wall 15. These receptacles may be secured in position in any preferred manner, such as by tabs 27 and screws 28.

Referring now to FIG. 1, each of the receptacles 21 through 26 inclusive includes a cylindrical face plate 29 which is snugly received in a hole formed in front wall 15 with the front faces of the plates 29 being substantially flush with the outer surface of front wall 15. Each of these plates 29 is formed with three arcuate sockets 30, 31 and 32. Twist-lock receptacles of this type are now well known and commonly available to the public and details thereof are not herein described. It is sufficient to point out that the sockets 30 and 31 are intended to receive the prongs connected to the live wires of a cable that goes to an electrically powered tool, while socket 32 receives the prong of a ground wire. The live wires which are connected to sockets 30 and 31 provide electric current of 120 volts to the particular tool which is connected to that socket.

Side wall 13 is formed with an opening at 33 in which is anchored one end of a so-called supply cable 34. This supply cable 34 carries a terminal 35 at its other end which includes four prongs 36.

As mentioned above, the contractor or builder temporarily installs at a suitable stage in the construction under way a main supply cable which provides a current of 30 amperes at 240 volts. This main supply cable includes a ground line, a neutral line, a live line at 120 volts below neutral and another live line at 120 volts above neutral. Thus, when an electrical device is connected across the two live lines, 240 volts is provided. However, when such a device is connected across one of the live lines and the neutral line, 120 volts is provided. This main supply line ends at a terminal which includes four sockets which are adapted to receive the four prongs 36.

Figure 3:
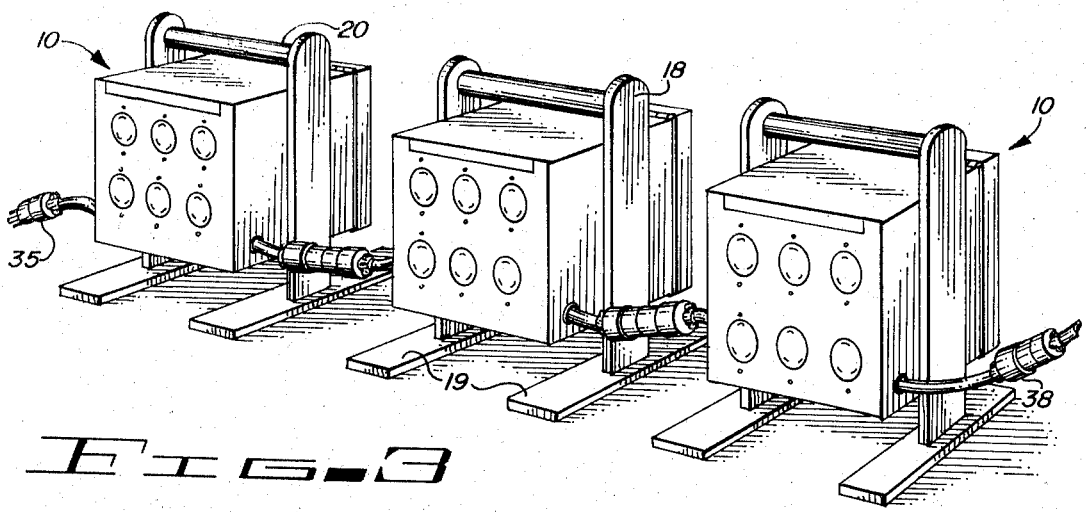
FIG. 3 is still another perspective illustrating three of the scatterboxes connected in series.

Extending from side wall 14 is an outlet cable 37 which includes the same ground, neutral and 120-volt lines as does cable 34 and has a terminal 38 at its free end which includes four sockets 39 which are adapted to receive the prongs 36 of the terminal 35 at the end of a cable 34 of another scatterbox. Thus, a plurality of these scatterboxes may be connected in series as illustrated in FIG. 3. In this connection, it is noted that while FIG. 3 illustrates three of these scatterboxes as closely assembled, it will be understood that on the actual job site they would be widely spaced apart.

Referring again to FIG. 2, a pair of circuit breakers 40 and 41 are shown as upstanding from bottom wall 12. These circuit breakers are of the type commonly known as ground fault circuit interrupters and are now commonly known and available to the public. Hence, details of these circuit breakers are not described other than to point out that each includes an operating arm 42 which is used to reset the circuit breakers to complete the circuit after it has been broken. Also mounted on the upper face of bottom wall 12 is a terminal plate 43 which is used in connecting certain of the wires included in the wiring which will now be described with reference to FIG. 4.

A ground bus is represented at 44. One end thereof is connected to the ground line in cable 34 and the other end to one of the sockets 39 in terminal 38, as indicated at 45. A neutral bus 46 has one end connected to the neutral line in cable 34 and its other end to one of the sockets 39 in terminal 38 as indicated at 47. A 120-volt bus 48 has one end connected to one of the 120-volt lines in cable 34 and its other end to one of the sockets 39 in terminal 38 as indicated at 49. A second 120-volt bus 50 has one end connected to the other 120-volt line in cable 34 and its other end to a socket 39 as indicated at 51.

Figure 4:
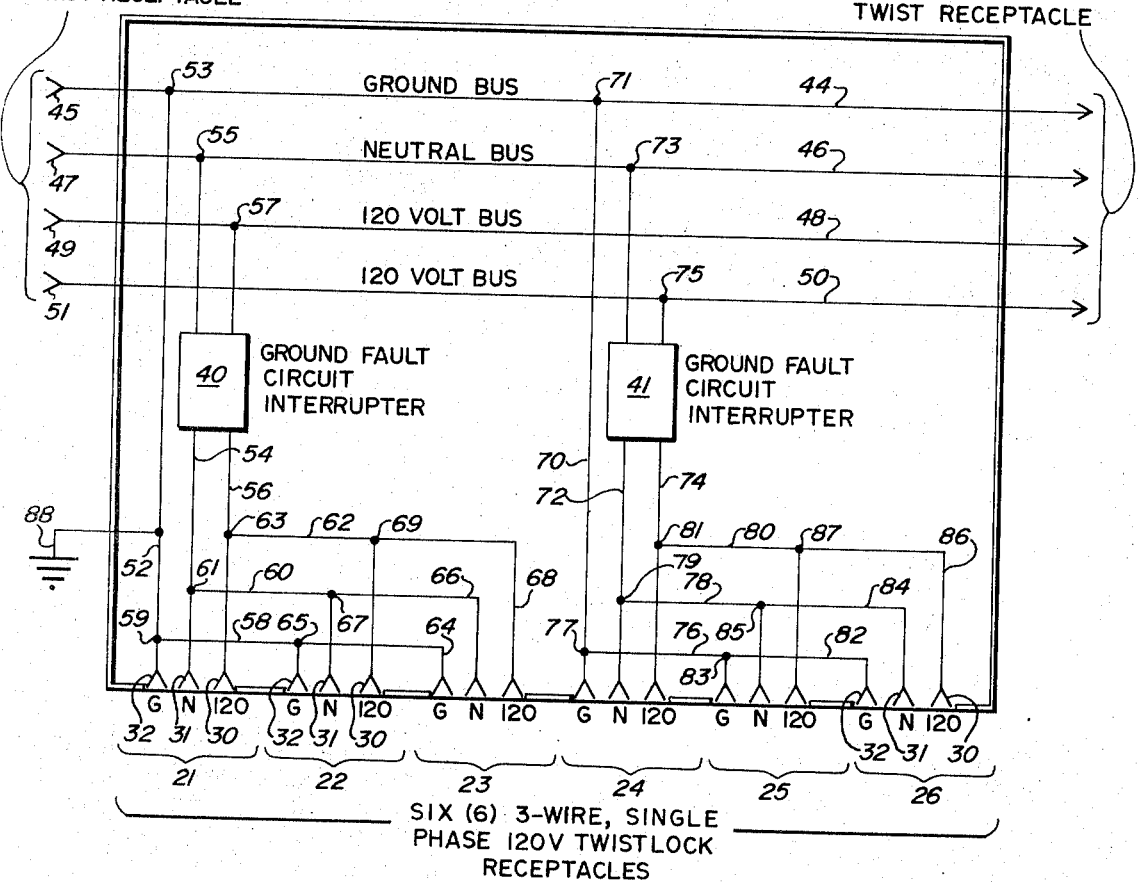
FIG. 4 is a wiring diagram illustrating the manner in which the various electrical components of the scatterbox are connected.

As FIG. 4 is a diagrammatic view, the outlet receptacles 21 through 26 are not illustrated in the two-row arrangement of FIG. 1. Thus, socket 32 of receptacle 21 is connected by a line 52 to ground bus 44 as indicated at 53. Socket 31 of receptacle 21 is connected by a line 54 to neutral bus 46 as indicated at 55. Socket 30 of receptacle 21 is connected by line 56 to 120-volt bus 48 as indicated at 57. Circuit breaker 40 is included in lines 54 and 56.

Socket 32 of receptacle 22 is connected by line 58 to ground line 52 as indicated at 59. Socket 31 of receptacle 22 is connected by line 60 to neutral line 54 as indicated at 61. Socket 30 of receptacle 22 is connected by line 62 to the 120-volt line 56 as indicated at 63. Thus, the live wire connections of terminal 52 are under the control of circuit breaker 40.

Socket 32 of receptacle 23 is connected by line 64 to ground line 58 as indicated at 65. Socket 31 of receptacle 23 is connected by line 66 to neutral line 60 as indicated at 67, and socket 30 is connected by line 68 to 120-volt line 62 as indicated at 69. Thus, the live wires of receptacle 23 are under the control of circuit breaker 40.

Socket 32 of receptacle 24 is connected to ground bus 44 by line 70 as indicated at 71. Socket 31 of receptacle 24 is connected by line 72 to neutral bus 46 as indicated at 73, and socket 30 is connected to 120-volt bus 50 by line 74 as indicated at 75. Circuit breaker 41 is included in lines 72 and 74.

Socket 32 of receptacle 25 is connected to ground line 70 by line 76 as indicated at 77. Socket 31 of receptacle 25 is connected to neutral line 72 by line 78 as indicated at 79. Socket 30 of receptacle 25 is connected to 120-volt line 74 by line 80 as indicated at 81. As circuit breaker 41 is included in lines 72 and 74, the live lines of receptacle 25 are controlled by circuit breaker 41.

Socket 32 of receptacle 26 is connected by line 82 to ground line 76 as indicated at 83. Socket 31 of receptacle 26 is connected by line 84 to neutral line 78 as indicated at 85. Socket 30 of receptacle 26 is connected by line 86 to 120-volt line 80 as indicated at 87. Thus, the live lines of receptacle 26 are controlled by circuit breaker 41.

It is notable that the ground lines are grounded to the metallic casing as indicated at 88.

OPERATION

While the manner of using the above described portable electric scatterbox and the manner in which it operates are believed to be obvious from the illustrations of the drawings and description of parts set forth above, it may be briefly described as follows:

A workman grasps the handle 20 and moves the scatterbox to a particular site of operation to be performed by power tools. Terminal 35 is plugged into the main supply cable which has been installed by the contractor, or may be plugged into the terminal 38 of another similar scatterbox. The workman now plugs the cable for a power tool into one of the twist-lock receptacles 21 through 26. He now operates the particular tool, and should any ground fault or other fault which might cause short circuiting occur, one of the circuit breakers 40 or 41 will be effective to that group of receptacles in which the particular one in use is included. Thus, if the fault occurs in any of the tools connected to receptacles 21, 22 or 23, tht circuit breaker 40 will be effective to interrupt the circuit to all of these receptacles. Likewise, should the fault occur in any of the tools connected to the receptacles 24, 25 or 26, circuit breaker 41 will interrupt the circuit to all of the receptacles.

Should the fault be due to a passing or temporary condition the workman throws the lever 42 of the particular circuit breaker to complete the circuits under its control. Should the circuit breaker again operate to interrupt these circuits, then the various cables and devices are inspected to determine the cause of the short circuiting.

It will be understood that 30-ampere 240-volt current in the main supply line is single phase as are the 120-volt currents coming from the receptacles 21 through 26.

While a preferred specific embodiment is herein disclosed, it is to be clearly understood that the invention is not to be limited to the exact constructions, mechanisms and devices illustrated and described because various modifications of these details may be provided in putting the invention into practice.

What is claimed is:

1. In a portable electric scatterbox for use on a site where electrically powered tools are operated and where there is a 240-volt main supply cable including a ground line, a neutral line and two 120-volt lines, one above and one below neutral, with said cable having a terminal with four sockets each connected to one of said lines,
   a. a box;
   b. a supply cable extending from said box and including a ground line, a neutral line and two 120-volt lines, said supply cable having a terminal with four prongs, each of which is connected to one of the lines in the cable, with all of said prongs being insertable in the sockets of the terminal of the main supply cable;
   c. said box including a panel on which is mounted six 120-volt outlet receptacles arranged in two groups with three receptacles in each group, each of said outlet receptacles having three sockets;
   d. a pair of ground fault circuit breakers in said box, and
   e. wiring connecting said outlet receptacles to said supply cable, said wiring comprising:
      1. a ground bus connected to the ground line of said supply cable;
      2. a neutral bus connected to the neutral line of said supply cable;
      3. a pair of 120-volt buses connected to the 120-volt lines of said supply cable;
      4. a ground line connecting said ground bus to one socket to each of said outlet receptacles of one of said groups of three receptacles;
      5. another ground line connecting said ground bus to one socket of each of said outlet receptacles of the other group of three receptacles;
      6. a neutral line connecting said neutral bus to a socket of each of said outlet receptacles of one of said groups of three receptacles;
      7. another neutral line connecting said neutral bus to one socket of each of the outlet receptacles of the other group of three receptacles;
      8. a 120-volt connecting one of said 120-volt buses to a socket of each outlet receptacle of one of said groups of three receptacles, and
      9. another 120-volt line connecting the other of said 120-volt buses to a socket of each of the outlet receptacles of the other group of three receptacles;

one of said circuit breakers being included in the neutral and 120-volt lines for one of said group of three receptacles, while the other circuit breaker is included in the neutral and 120-volt line of the other group of three receptacles.

2. The scatterbox of claim 1 in which the terminal on the main supply cable is a twist-lock terminal.

3. The scatterbox of claim 1 in which each of said outlet receptacles is a twist-lock receptacle.

4. The scatterbox of claim 1, together with an outlet cable extending from said box and including a ground line connected to the ground bus, a neutral line connected to the neutral bus, and a pair of 120-volt lines connected to said 120-volt buses, said outlet cable having a terminal with four sockets, each of which is connected to one of said lines in said outlet cable, said sockets being complemental to and adapted to receive the prongs on the terminal of the supply cable of another scatterbox.

5. The scatterbox of claim 1 in which said box includes a top, bottom, side and front walls and in which said outlet receptacles are mounted on said front wall, together with a pair of legs mounted externally of said side walls and extending above said top wall and below said bottom wall, a foot on each of said legs, a handle extending between said legs in spaced relation above said top wall, and a rear wall hingedly mounted on said top.

6. The scatterbox of claim 5 together with a rear wall hingedly mounted on an edge of said top wall.

7. The scatterbox of claim 1 in which said box is metallic and said ground lines are grounded to said box.

* * * * *